United States Patent [19]

Kiilunen

[11] 4,087,673

[45] May 2, 1978

[54] METHOD OF WELDING AND ELECTRODE THEREFORE

[75] Inventor: Matt Kiilunen, Brighton, Mich.

[73] Assignee: Weld Mold Company, Northville, Mich.

[21] Appl. No.: 695,281

[22] Filed: Jun. 11, 1976

[51] Int. Cl.² .................. B23K 9/24; B23K 35/22
[52] U.S. Cl. ..................... 219/137 WM; 106/51;
148/26; 219/146.1; 428/387
[58] Field of Search ............... 219/146, 137 WM;
148/26; 228/224, 203; 106/51

[56] References Cited

U.S. PATENT DOCUMENTS

| 1,708,815 | 4/1929 | Wille | 219/146 |
|---|---|---|---|
| 2,626,339 | 1/1953 | Wasserman | 219/146 |
| 2,900,490 | 8/1959 | Petryck | 219/146 X |
| 3,024,137 | 3/1962 | Witherell | 219/146 X |
| 3,223,818 | 12/1965 | Chyle | 228/224 X |
| 3,301,997 | 1/1967 | Semenchuk | 219/137 WM |
| 3,398,256 | 8/1968 | Foley | 219/146 |
| 3,778,588 | 12/1973 | Bishel | 219/137 WM X |
| 3,999,035 | 12/1976 | Miyao | 217/137 WM X |

FOREIGN PATENT DOCUMENTS 1,049,878  11/1966  United Kingdom ........ 219/137 WM

OTHER PUBLICATIONS

Barnett, O. T., *Filler Metals of Joining*, Reinhold Pub. Corp., N.Y., 1959, pp. 91–100.

Primary Examiner—Richard E. Schafer
Attorney, Agent, or Firm—Cullen, Settle, Sloman & Cantor

[57] ABSTRACT

An electrode for and method of welding cast iron and the like metals utilizing a 99% nickel rod in the presence of an alloying flux containing large amounts (30 to 60%) of iron plus manganese and carbon to yield a weld metal having the general composition: Nickel 60–85%, Iron 15–40%, Manganese 1.5–5%, Carbon 1–3% and Silicon 0.25–2%. The flux is preferably present as a rod coating and comprises from about 40% to about 60% of the weight of the composite coated rod. The coated rod can be used in any generally excepted welding technique including the use of alternating current, direct current straight polarity or direct current reverse polarity welding operations.

7 Claims, No Drawings

METHOD OF WELDING AND ELECTRODE THEREFORE

BACKGROUND OF THE INVENTION

This invention is concerned with the welding of cast iron and the joining of cast iron to itself or to other materials, such as any type of ferrous metal, copper, or bronze.

In the past, the welding of gray cast iron has posed substantial problems. The two types of welding electrodes which are commonly used for the welding, joining and repair of cast iron are (1) a 99% nickel rod coated with conventional flux coatings (typically comprising alkaline earth metal carbonate and fluorides and silicate binders) and (2) a 55% nickel, 45% iron alloy coated with a similar flux. The fluxes may contain small amounts of carbon, manganese, and a trace of silicon. These welding electrodes generally are utilized with direct current, reverse polarity welding machines, and they preform quite poorly with alternating current machines.

The more generally used of these two electrodes is the 55% nickel, 35% iron alloy. This alloy has extremely poor electrical conductivity properties, in fact various types of nickel-iron alloys, commonly referred to as calrods, are used for electric stove heating elements and the like. The high electrical resistance of the 55% nickel, 45% iron alloy makes its use in welding difficult and often impractical. For example, a 14-inch electrode which is ⅛ inch in diameter will reach a temperature of approximately 1200° F when consumed about 50% at 115 amps, and when 65% consumed, the electrode will be red hot at a temperature of approximately 1500° F. In order to consume the complete electrode in a welding operation, extra care and heat adjustments, along with a low degree of control is used, making the welding quite difficult and time consuming. The use of the 99% nickel electrode with conventional flux coatings results in a weld having quite poor physical characteristics.

As a result of these problems, the present techniques for welding cast iron leave much to be desired.

In the prior art, U.S. Pat. No. 3,301,997 proposes welding ductile iron using a nickel-iron alloy rod capable of depositing a nickel-iron alloy. Here the welding rod itself is an alloy and suffers from the problems of over-heating, limited utility, etc above explained.

U.S. Pat. No. 2,471,803 discloses a flux for application to steel, nickel, monel metal, bronze and the like rods. The flux contains iron only in the form of ferro-chrome, ferro-silicon, or deoxidizing alloys in limited amounts only (up to 5% each). Obviously, it is impossible to introduce substantial amounts of iron into the weld metal alloy, when using a nickel core rod.

Canadian Pat. No. 625,690 proposes a welding electrode having a core material of steel, nickel-iron alloy or nickel coated with a flux containing a silicon, nickel and/or iron in the form of a fine powder to make the flux conductive. There is no definition of the weld metal composition and there is no suggestion of forming an iron-nickel alloy during welding.

BRIEF SUMMARY OF THE PRESENT INVENTION

The present invention now proposes the utilization of a method of welding or joining cast iron to itself or other metals by the utilization of a 99% nickel rod in the presence of an alloying flux containing large amounts of iron plus manganese and carbon to yield a weld metal alloy of improved physical characteristics, of excellent machinability and of increased hardness. Further, the composite welding alloy comprising the nickel rod coated with the alloying flux makes it possible to weld cast iron with good arc stability and wet out, with excellent arc direction and control, and with good restrike characteristics, thus making possible the economical deposition of weld metal per length of electrode consumed.

The nickel rod further has good electrical conductivity characteristics and eliminates any over heating during welding. Also, it is possible to utilize the composite nickel rod with its alloying flux coating for direct current reverse polarity welding and alternating current welding, as well as for direct current straight polarity welding.

More specifically, the alloying flux contains from 30 to 60% iron, plus sufficient manganese and copper to yield a weld metal having the following composition:

| Ingredient | from about % to about % by weight |
|---|---|
| Nickel | 60 – 85% |
| Iron | 15 – 40% |
| Manganese | 1.5 – 5% |
| Carbon | 1 – 3% |
| Silicon | 0.25 – 2% |

DESCRIPTION OF THE PREFERRED EMBODIMENT

As above explained, the electrode of the present invention comprises a 99% nickel rod having applied thereto an enveloping, exterior alloying flux coating.

The flux coating contains the normal fluxing ingredients such as an alkali metal silicate, typically sodium or potassium silicate in water and typically containing about 45% solids. Any suitable silicate binder can be utilized and is normally present in the flux in amounts ranging from about 3% to about 10%.

A second normally present fluxing ingredient is an alkaline earth fluxing ingredient, typically either an alkaline earth carbonate, an alkaline earth fluoride or mixtures thereof. Typical examples would include mixtures of barium fluoride, barium carbonate, calcium carbonate and calcium fluoride. Such alkaline earth fluxing ingredients are normally present in an amount equal to from about 25 to about 50% above weight of the flux coating.

Typically, an extrusion aid, such as sodium hydroxy methylcellulose is added in an amount from about ½ to about 2½%.

In addition to these ingredients of the flux, the flux coating of the present invention includes specific alloying metals. Primarily, the alloying metal is iron which is added in powdered form in an amount ranging from about 30 to about 60% by weight of the total flux. Iron is also present as ferromanganese, and this ingredient ranges from about 3 to about 10% by weight of the total flux. The ferromanganese is added primarily as a source of manganese in the final weld metal alloy.

To provide carbon in the final alloy, carbon in the form of graphite is added to the flux coating in the amount ranging from about 5 to about 15% by weight of the total flux coating.

During welding, the electrode is utilized in the normal manner, the 99% nickel rod serving as the electric conductor and, because of its good electrical conductivity, the rod can be readily and substantially completely consumed without overheating. This makes possible the utilization of the rod of the present invention for direct current, straight polarity and alternating current welding as well as direct current reverse polarity welding.

During the welding operation, the alloying ingredients in the flux coating form an alloy with the nickel of the consumable rod, and the resulting weld metal alloy has the following composition:

| Ingredient | from about % to about % by weight |
|---|---|
| Nickel | 60 – 80% |
| Iron | 40 – 15% |
| Manganese | 1.5 – 5% |
| Carbon | 1 – 3% |
| Silicon | 0.25 – 2% |

The weld metal alloys falling within the above composition ranges are substantially stronger than the weld metal obtained from a 99% nickel rod coated with a flux containing normal fluxing ingredients, but without the alloying ingredients. The flux coated nickel rod of the present invention is less expensive than the 55% nickel, 45% iron alloy rods previously utilized, and it is fully consumable without overheating, even when utilizing any of the three desired welding techniques. The weld metal can be drilled, machined, tapped, or otherwise work throughout the complete weld zone. The adaptability of the electrode of the present invention to alternating current machines are quite desireable, since alternating current machines are much less expensive than direct current machines, and such machines are utilizable in rural areas and other places where a supply of direct current is not available.

All in all, it will be appreciated that the method of the present invention and the alloy coated electrode to the present invention solves many of the problems previously encountered in the welding of cast iron.

The following examples are intended as representative only, and these examples present differing formulations of flux coatings capable of forming weld metal alloys of differing compositions. Of course, the flux ingredients can be varied widely, particularly with respect to the alkali metal silicate binder, alkaline earth carbonate and fluoride, extrusion aid material, and the like.

Baring these variations in mind, the following examples illustrate certain specific electrode flux coatings to obtain specific weld metal alloys as follows:

EXAMPLE I

Four nickel rods, each having the composition 99% nickel and the remainder various impurities, were coated with a flux having the composition:

| Ingredient | Parts by wt. | % Composition |
|---|---|---|
| Barium carbonate | 45 | 19.2 |
| Calcium carbonate | 15 | 6.4 |
| Calcium fluoride | 20 | 8.5 |
| Barium fluoride | 5 | 2.1 |
| Graphite | 22 | 9.4 |
| Sodium or potassium silicate binder (55% H₂o) | (34) 15.3 (Solids) | 6.5 |
| Sodium hydroxy methylcellulose | 2.5 | 1.1 |
| Iron | 90 | 38.3 |
| Aluminum Silicate | 2 | .8 |
| Ferromanganese | 18 | 7.7 |
| TOTAL | 235 | 100 |

The rods were 14 inches long and 0.125 inch in diameter and were coated by being passed through a coating die having an opening of 0.220 inch, thus applying a peripheral coating of 0.048 to the central rod. Four of the bare rods weighed 3.52 ounces, the four coated rods weighed 6.30 ounces, each rod receiving a coating of 0.695 ounces. In the final coated rod, 44.12% of the weight was in the flux coating.

The coated electrodes were utilized to weld cast iron by direct current straight polarity, direct current reverse polarity and alternating current techniques.

An analysis of the weld metal laid down during welding gave the following results:

| Ingredient | % by weight |
|---|---|
| Carbon | 1.85 |
| Manganese | 2.85 |
| Silicon | 0.96 |
| Iron | 21.61 |
| Nickel | Balance |

EXAMPLE II

Four nickel rods, each having the composition 99% nickel and the remainder various impurities, were coated with a flux having the composition:

| Ingredient | Parts by wt. | % Composition |
|---|---|---|
| Barium carbonate | 45 | 18.4 |
| Calcium carbonate | 15 | 6.1 |
| Calcium fluoride | 20 | 8.2 |
| Barium fluoride | 5 | 2.0 |
| Graphite | 22 | 9.0 |
| Sodium or potassium silicate binder (55% H₂O) | (34) 15.3 | 6.3 |
| Sodium hydroxy methylcellulose | 2.5 | 1.0 |
| Iron | 100 | 40.8 |
| Aluminum Silicate | 2 | 0.8 |
| Ferromanganese | 18 | 7.4 |
| TOTAL | 245 | 100 |

The rods were 14 inches long and 0.125 inch in diameter and were coated by being passed through a coating die having an opening of 0.240 inch, thus applying a peripheral coating of 0.057 to the central rod. Four of the bare rods weighed 3.52 ounces, the four coated rods weighed 7.21 ounces, each rod receiving a coating of 0.925 ounces. In the final coated rod, 51.18% of the weight was in the flux coating.

The coated electrodes were utilized to weld cast iron by direct current straight polarity, direct current reverse polarity and alternating current techniques.

An analysis of the weld metal laid down during welding gave the following results:

| Ingredient | % by weight |
|---|---|
| Carbon | 1.86 |
| Manganese | 4.46 |
| Silicon | 0.35 |
| Iron | 31.19 |
| Nickel | Balance |

EXAMPLE III

Nickel rods, each having the composition 99% nickel and the remainder various impurities, were coated with a flux having the composition:

| Ingredient | Parts by wt. | % Composition |
|---|---|---|
| Barium carbonate | 45 | 15.4 |
| Calcium carbonate | 15 | 5.1 |
| Calcium fluoride | 20 | 6.8 |
| Barium fluoride | 5 | 1.7 |
| Graphite | 22 | 7.5 |
| Sodium or potassium silicate binder (55% H$_2$O) | 15.3 (34) | 5.2 |
| Sodium hydroxy methylcellulose | 2.5 | 0.8 |
| Iron | 148 | 50.6 |
| Aluminum Silicate | 2 | 0.7 |
| Ferromanganese | 18 | 6.2 |
| TOTAL | 293 | 100 |

The rods were 14 inches long and 0.125 inch in diameter and were coated by being passed through a coating die having an opening of 0.265 inch, thus applying a peripheral coating of 0.140 to the central rod. Each of the bare rods weighed 0.88 ounces, the coated rods each weighed 2.16 ounces, each rod receiving a coating of 1.28 ounces. If the final coated rod, 59.26% of the weight was in the flux coating.

The coated electrodes were utilized to weld cast iron by direct current straight polarity, direct current reverse polarity and alternating current techniques.

An analysis of the weld metal laid down during welding gave the following results.

| Ingredient | % by weight |
|---|---|
| Carbon | 2.29 |
| Manganese | 4.03 |
| Silicon | 0.57 |
| Iron | 34.47 |
| Nickel | Balance |

I claim:

1. A welding electrode capable of depositing weld metal of the composition

| Ingredient | from about % to about % by weight |
|---|---|
| Nickel | 60 – 85 |
| Iron | 40 – 15 |
| Manganese | 1.5 – 5 |
| Carbon | 1 – 3 |
| Silicon | 0.25 – 2 | said electrode comprising an axially extending metallic nickel rod and an enclosing flux coating comprising fluxing ingredients selected from the group consisting of alkaline earth carbonates and fluorides, an alkali metal silicate binder, graphite and a mixture of iron powder and ferromanganese, the iron content of said flux ranging from about 35 to about 60% by weight of the flux, and the flux constituting from about 40 to about 60% by weight of the complete electrode.

2. In a method of welding a workpiece of cast iron to itself or to other metals, the steps of passing an electric current through an electrode of metallic nickel coated with a flux comprising fluxing ingredients selected from the group consisting of alkaline earth carbonates and fluorides, an alkali metal silicate binder, graphite and from about 30 to about 60% by weight of metallic iron present in the flux as iron powder and ferromanganese, and depositing on said workpiece weld metal having the composition:

| Ingredient | from about % to about % by weight |
|---|---|
| Nickel | 60 – 85 |
| Iron | 40 – 15 |
| Manganese | 1.5 – 5 |
| Carbon | 1 – 3 |
| Silicon | 0.25 – 2 |

3. In a coated electrode for depositing weld metal as an iron-nickel alloy, a flux coating applied to a nickel base rod and comprising:

| Ingredient | from about % to about % by weight |
|---|---|
| Powdered iron | 30 – 60 |
| Ferromanganese | 3 – 10 |
| Alkali metal silicate (solids) | 3 – 10 |
| Alkaline earth fluxing ingredient (carbonate & fluoride) | 25 – 50 |
| carbon | 5 – 15 | the flux coating constituting from about 40 to about 60% of the total weight of the coated electrode.

4. In a method of welding cast iron to itself or to other metals by alternating current, direct current straight polarity or direct current reverse polarity methods, the step of passing the welding current through a welding rod of metallic nickel in the presence of an alloying flux containing from about 30 to about 60% iron, from about 3 to about 10% ferromanganese, from about 5 to about 15% carbon and the remainder conventional fluxing and binding ingredients to obtain a weld metal which is an iron-nickel alloy having the following composition:

| Ingredient | from about % to about % by weight |
|---|---|
| Nickel | 60 – 85% |
| Iron | 15 – 40% |
| Manganese | 1.5 – 5% |
| Carbon | 1 – 3% |
| Silicon | 0.25 – 2% |

5. A welding electrode capable of depositing weld metal of the composition:

| Ingredient | from about % to about % by weight |
|---|---|
| Nickel | 60 – 85 |
| Iron | 40 – 15 |
| Manganese | 1.5 – 5 |
| Carbon | 1 – 3 |
| Silicon | 0.25 – 2 | said electrode comprising an axially extending metallic nickel rod and an flux coating consisting essentially of:

| Ingredient | from about % to about % by weight |
|---|---|
| Powdered iron | 30 – 60 |
| Ferromanganese | 3 – 10 |
| Alkali metal silicate (solids) | 3 – 10 |
| Alkaline earth fluxing ingredient (carbonate & fluoride) | 25 – 50 |
| carbon | 5 – 15 | the flux coating constituting from about 40 to about 60% of the total weight of the coated electrode.

6. In a method of welding cast iron to itself or to other metals by alternating current, direct current straight polarity or direct current reverse polarity methods, the step of passing the welding current through a welding rod of metallic nickel in the presence of an alloying flux consisting essentially of:

| Ingredient | from about % to about % by weight |
| --- | --- |
| Powdered iron | 30 – 60 |
| Ferromanganese | 3 – 10 |
| Alkali metal silicate (solids) | 3 – 10 |
| Alkaline earth fluxing ingredient (carbonate & fluoride) | 25 – 50 |
| carbon | 5 – 15 | the flux coating constituting from about 40 to about 60% of the total weight of the coated electrode, to obtain a weld metal which is an iron-nickel alloy having the following composition:

| Ingredient | from about % to about % by weight |
| --- | --- |
| Nickel | 60 – 85% |
| Iron | 15 – 40% |
| Manganese | 1.5 – 5% |
| Carbon | 1 – 3% |
| Silicon | 0.25 – 2% |

7. In a method of welding cast iron to itself or to other metals by alternating current, direct current straight polarity or direct current reverse polarity methods, the steps of applying to a welding rod of metallic nickel an alloying flux coating containing from about 30 to about 60% iron, from about 3 to about 10% ferromanganese, from about 5 to about 15% carbon, from about 25 to about 50% alkaline earth fluxing ingredients and from about 3 to about 10% alkali metal silicate, and utilizing the coated rod to deposit a weld metal which is an iron-nickel alloy having the following composition:

| Ingredient | from about % to about % by weight |
| --- | --- |
| Nickel | 60 – 85% |
| Iron | 15 – 40% |
| Manganese | 1.5 – 5% |
| Carbon | 1 – 3% |
| Silicon | 0.25 – 2% |

* * * * *